US008683129B2

(12) United States Patent
Ono et al.

(10) Patent No.: US 8,683,129 B2
(45) Date of Patent: Mar. 25, 2014

(54) USING SPECULATIVE CACHE REQUESTS TO REDUCE CACHE MISS DELAYS

(75) Inventors: Tarik Ono, Cupertino, CA (US); Mark R. Greenstreet, Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 309 days.

(21) Appl. No.: 12/909,429

(22) Filed: Oct. 21, 2010

(65) Prior Publication Data

US 2012/0102269 A1 Apr. 26, 2012

(51) Int. Cl.
*G06F 12/08* (2006.01)

(52) U.S. Cl.
USPC .................. 711/122; 711/154; 711/E12.024; 712/E9.05

(58) Field of Classification Search
None
See application file for complete search history.

(56) References Cited

U.S. PATENT DOCUMENTS

| | | | | |
|---|---|---|---|---|
| 4,357,607 | A * | 11/1982 | Van der Heijden et al. | 342/197 |
| 5,012,410 | A * | 4/1991 | Ueda | 711/3 |
| 5,845,101 | A * | 12/1998 | Johnson et al. | 711/125 |
| 5,860,106 | A * | 1/1999 | Domen et al. | 711/154 |
| 5,900,022 | A * | 5/1999 | Kranich | 711/205 |
| 6,076,146 | A * | 6/2000 | Tran et al. | 711/125 |
| 6,085,291 | A * | 7/2000 | Hicks et al. | 711/137 |
| 6,205,520 | B1 * | 3/2001 | Palanca et al. | 711/138 |
| 6,418,516 | B1 * | 7/2002 | Arimilli et al. | 711/138 |
| 6,496,917 | B1 * | 12/2002 | Cherabuddi et al. | 711/204 |
| 6,643,766 | B1 * | 11/2003 | Lesartre et al. | 711/137 |
| 7,055,023 | B2 * | 5/2006 | Tago et al. | 712/240 |
| 7,328,433 | B2 * | 2/2008 | Tian et al. | 711/123 |
| 7,373,482 | B1 * | 5/2008 | Spracklen et al. | 712/207 |
| 7,472,256 | B1 * | 12/2008 | Nair et al. | 712/207 |
| 2002/0169929 | A1 * | 11/2002 | Riedlinger et al. | 711/140 |
| 2003/0070062 | A1 * | 4/2003 | Krishnan et al. | 712/234 |
| 2004/0123081 | A1 * | 6/2004 | Knies et al. | 712/225 |
| 2004/0199752 | A1 * | 10/2004 | Winberg et al. | 712/225 |
| 2004/0215891 | A1 * | 10/2004 | Dodson et al. | 711/137 |
| 2005/0146613 | A1 * | 7/2005 | Silverbrook et al. | 348/207.2 |
| 2006/0143384 | A1 * | 6/2006 | Hughes et al. | 711/130 |
| 2008/0046736 | A1 * | 2/2008 | Arimilli et al. | 713/176 |
| 2008/0301256 | A1 * | 12/2008 | McWilliams et al. | 714/758 |
| 2009/0019229 | A1 * | 1/2009 | Morrow et al. | 711/137 |
| 2009/0024835 | A1 * | 1/2009 | Fertig et al. | 712/207 |
| 2009/0037664 | A1 * | 2/2009 | Kornegay et al. | 711/138 |

OTHER PUBLICATIONS

Steffan, J. Gregory. "Hardware Support for Thread-Level Speculation." Computer Science Department, Carnegie Mellon University, Apr. 2003.*
Kessler, R. E. et al., "Inexpensive Implementations of Set-Associativity", ACM SICARCH Computer Architecture News, vol. 17, Issue 3, Jun. 1989, pp. 131-139.

* cited by examiner

*Primary Examiner* — Matthew Bradley
*Assistant Examiner* — Daniel Bernard
(74) *Attorney, Agent, or Firm* — Park, Vaughan, Fleming & Dowler LLP; Mark Spiller (57) ABSTRACT

The disclosed embodiments provide a system that uses speculative cache requests to reduce cache miss delays for a cache in a multi-level memory hierarchy. During operation, the system receives a memory reference which is directed to a cache line in the cache. Next, while determining whether the cache line is available in the cache, the system determines whether the memory reference is likely to miss in the cache, and if so, simultaneously sends a speculative request for the cache line to a lower level of the multi-level memory hierarchy.

20 Claims, 6 Drawing Sheets

USING SPECULATIVE CACHE REQUESTS TO REDUCE CACHE MISS DELAYS

BACKGROUND

1. Field of the Invention

This disclosure generally relates to techniques for reducing cache miss delays for processors in computer systems. More specifically, this disclosure relates to techniques for simultaneously sending speculative memory access requests to lower levels of a multi-level memory hierarchy during a cache access.

2. Related Art

To achieve high instruction throughput rates, the memory subsystem of a processor typically includes multiple levels of cache memories. Accesses to such cache memories generally operate as follows. During execution, a processor may execute a program instruction that references a memory location. If the referenced memory location is not available in a level one (L1) cache, a cache miss causes the L1 cache to send a corresponding request to a level two (L2) cache. Next, if the referenced memory location is also not available in the L2 cache, additional requests may need to be sent to lower levels of the processor's memory hierarchy.

Unfortunately, while caching techniques generally improve memory access speeds, such sequential misses to both the L1 and L2 caches are sometimes unavoidable. Furthermore, serially handling a set of sequential misses for multiple levels of a memory hierarchy can lead to a substantial combined miss delay. Hence, what is needed are techniques for accessing caches efficiently without the above-described problems.

SUMMARY

The disclosed embodiments provide a system that uses speculative cache requests to reduce cache miss delays for a cache in a multi-level memory hierarchy. During operation, the system receives a memory reference which is directed to a cache line in the cache. While determining whether the cache line is available in the cache, the system determines whether the memory reference is likely to miss in the cache, and if so, simultaneously sends a speculative request for the cache line to a lower level of the multi-level memory hierarchy.

In some embodiments, the system determines whether the memory reference is likely to miss in the cache prior to completing a full lookup operation in the cache. This enables the system to preemptively send the speculative request to reduce the cache miss delay when the cache line is not available in the cache.

In some cases, the system receives an indication (e.g., in the memory reference instruction) that indicates that the cache line is likely to miss in the cache. In other cases, the system determines that the cache line is likely to miss in the cache by using tracking data that is stored during the execution of a program.

In some embodiments, the system profiles a program executing on a processor to identify program instructions that are likely to cause cache misses. The system analyzes this profile information to identify such instructions, and then modifies these program instructions so that they can be easily identified during execution. For instance, the system may mark a field in the program instruction that indicates that the instruction is likely to cause cache misses and should trigger a speculative request to a lower level of the memory hierarchy.

In some embodiments, the system uses one or more counters to track previous hits and misses for a memory reference. The system subsequently uses the values tracked in these counters to determine whether the memory reference is likely to miss in the cache. Such counters may take a range of forms including, but not limited to, one or more of the following: a hit counter; a miss counter; a counter that tracks the number of times an instruction is executed; a "saturating" counter that is incremented on hits and decremented on misses; and/or an asymmetric counter that weighs hits and misses differently.

In some embodiments, the system compares a calculated value that is derived from the tracked hit and miss information with a threshold to determine whether or not to send a speculative request.

In some embodiments, the system sends speculative requests for the cache line to multiple levels of the multi-level memory hierarchy in parallel.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Caching and Multi-Level Memory Hierarchies

A modern high-performance processor typically devotes large areas of semiconductor real estate to specialized hardware structures that cache frequently accessed data and speed up address translations. For instance, such specialized hardware structures may include multiple levels of SRAM (or DRAM) caches and multiple levels of translation lookaside buffers (TLBs), which cache page-table translations.

Figure 1:
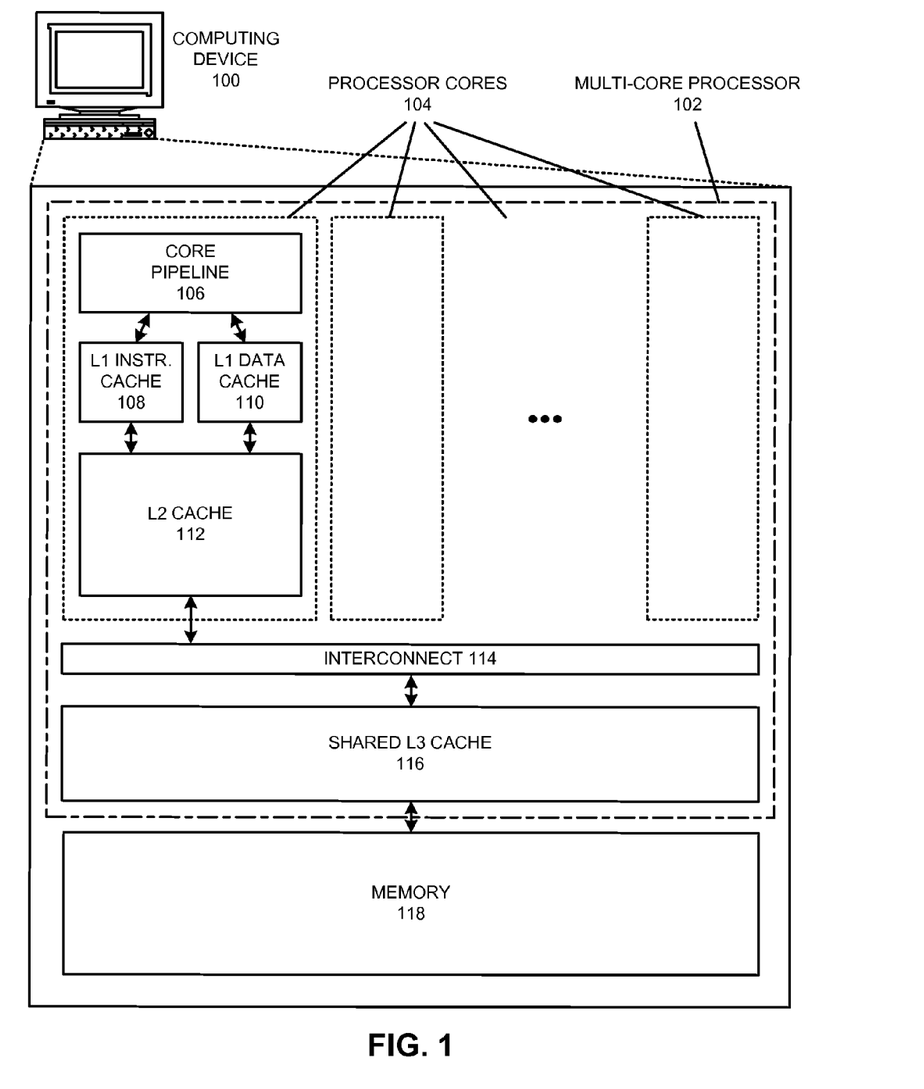
FIG. 1 illustrates an exemplary computing device that includes a multi-core processor with a set of structures for caching memory data in accordance with an embodiment.

For example, FIG. 1 illustrates an exemplary computing device 100 that includes a multi-core processor 102 with a set of structures for caching memory data. Multi-core processor 102 can include one or more processor cores 104, each of which includes a processor core pipeline 106, an L1 instruction cache 108 and an L1 data cache 110. Each set of L1 caches (108-110) is backed by an L2 cache 112. Processor cores 104 use interconnect 114 to access a shared L3 cache 116, which can load data from memory 118.

Every time memory is referenced by an instruction executing in the core (e.g., a store instruction that is storing data in a cache, or a load or pre-fetch instruction loading data from the cache), the L1 data cache 110 (also referred to as the D$) is checked first. If the data is found in L1 data cache 110, it is loaded into the core pipeline 106. If the data is not found, a cache miss is signaled, and L2 cache 112 is accessed. If L2 cache 112 also misses, L3 cache 116 is accessed. If L3 cache 116 misses as well, then the data is fetched from the off-chip memory 118. Note that the memory hierarchy illustrated in FIG. 1 is exemplary, and different implementations may have additional cache levels as well as additional cache and TLB structures (not illustrated) that are shared across multiple processor cores. Also, inter-processor interconnect 114 may be placed at other (or multiple) levels of the memory hierarchy (e.g., other than and/or in addition to at the L2/L3 boundary), and some multiprocessors may include a hierarchy of such interconnect. For instance, in an exemplary multiprocessor, each processor core includes its own L1 caches, a first set of interconnect allows a "cluster" of two or more such processor cores to share an L2 cache, a second set of interconnect allows several such clusters to share an L3 cache, and additional interconnect between chips combines such grouped clusters into a larger multiprocessor.

In general, smaller caches located closer to the core pipeline (e.g., L1 caches) provide faster access times and consume less power than the larger caches (e.g., the L2 and L3 caches). For example, in some modern processors with three-level cache hierarchies (e.g., multi-core processor 102 illustrated in FIG. 1), data in the L1 caches can be accessed in a few processor cycles, while an L2 access takes on the order of 10-20 cycles, and an L3 access generally takes over 20 cycles. Caches are typically sized in such a way that for most applications the L1 cache's hit rate is well over 50%, thereby reducing contention and power use in the lower levels of the memory hierarchy. However, memory references that cause cascading misses across every level of the memory hierarchy, while relatively infrequent, typically incur a large latency penalty due to the sequential lookups.

Note that pre-fetching techniques can sometimes be used to avoid a subset of cache misses. For instance, a compiler may identify data that will be needed in the future and can insert pre-fetch instructions into the program that pre-load the cache hierarchy with the needed data in advance, thereby averting a cache miss and associated pipeline stalls. However, pre-fetching efforts may also "pollute" the cache hierarchy by displacing needed data, thereby causing additional unexpected misses. Furthermore, pre-fetches can only be executed as early as the point at which the memory address being referenced has been computed (or can be guessed). Hence, pre-fetching techniques can help reduce cache misses in some situations, but are not a complete solution.

Alternatively, some processors re-order or otherwise delay the issuance of instructions that depend on a miss. Such techniques can sometimes reduce the performance impact of a cache miss, but involve substantial area, complexity, and overhead, and often only provide limited performance benefits.

Embodiments of the present information seek to reduce the cache miss delays associated with cascading misses by simultaneously sending additional speculative requests to lower levels of the memory hierarchy.

Sending Speculative Cache Requests

A multi-level cache hierarchy is typically structured such that a majority of memory references hit in the upper levels of the cache hierarchy (Note that in this document, "lower" in the memory hierarchy refers to caches closer to the main memory, and the highest level of the memory hierarchy is the L1 cache). However, as described above, the memory references that miss can involve substantial additional delay. While the actual set of memory references generated by a program are application-specific, a small set of instructions typically account for a high percentage of cache misses. For instance, in many applications most load instructions either miss infrequently (less than 10% of times they are issued) in the L1 cache, or almost always miss (over 90% of times they are issued) in the L1 cache. Instructions which miss frequently are also likely to miss in lower levels of the memory hierarchy, and thus have a very high associated miss delay. Embodiments of the present invention attempt to either statically or dynamically identify such miss-prone instructions, and initiate preemptive, speculative fetches to reduce their associated cache miss delays.

One embodiment of the present invention identifies instructions that are likely to miss in multiple cache levels, and then simultaneously issues speculative requests to one or more levels of the memory hierarchy to reduce cache miss latency. Issuing a speculative request to a lower level of the memory hierarchy can reduce the cascading miss effect by expediting the loading of desired data into lower levels of the memory hierarchy. For instance, when executing a load instruction, a processor can use gathered data to make an educated guess as to whether the load is likely to hit or miss in the L1 cache. If the instruction is likely to miss, load requests can be sent to both the L1 and L2 cache hierarchies in parallel, thereby immediately initiating the load of the needed data from the L2 cache into the L1 cache (e.g., instead of waiting until after the L1 cache has missed to send a request to the L2 cache). Note that a range of tracking and profiling techniques may be used to make such educated guesses. Furthermore, aspects of these techniques may be incorporated into a processor, one or more components of the memory hierarchy, and/or a compiler.

In some embodiments, the speculation system tracks the number of times a memory access instruction (e.g., a load, pre-fetch, or store instruction) hits or misses for a cache level. This information can then be used when executing the instruction to determine whether a speculative request should be sent. For instance, the processor and/or components of the memory hierarchy may include hardware counters that track instruction hit and miss rates for each level of the memory hierarchy (e.g., for an L1 cache, an L2 cache, an L3 cache, and main memory). Such counters may take a range of forms including, but not limited to, one or more of the following: separate hit and miss counters; a single "saturating" counter that is incremented on hits and decremented on misses (where, when the counter reaches a maximum value, it remains at that maximum value until a miss is encountered); and/or an asymmetric counter that weighs hits and misses differently (e.g., a counter that is incremented by a value n whenever a load hits in the cache, and is decremented by a value m whenever the load instruction misses in the cache). Note that hit and miss rates can also be tracked using the combination of a counter that tracks the number of times an instruction is executed and either a hit or a miss counter. For example, if a set of counters tracks the number of executions and the number of misses for a program instruction, the system can calculate the number of hits for that program instruction by subtracting the number of misses from the number of executions.

The number of counters needed to track hit and miss rates for multiple instructions and multiple cache levels may vary depending on the application being executed. For example, as with branch predictors, a processor may be provisioned with a fixed set of counters that can be used to track a limited moving window of recent memory-accessing instructions. Because of spatial and temporal locality, even a small number of counters may suffice to reduce the cache miss penalty. Note also that the system may use a range of techniques when encountering a new instruction that has not been tracked. For instance, upon encountering a new load instruction that has not been assigned a counter, the system may perform one or more of the following: issue a speculative load in an attempt to minimize possible load delay; not issue a speculative load for untracked instructions; and/or use aggregated data from previous tracked and/or untracked instructions to determine whether or not to issue a speculative load for the untracked instruction.

In some embodiments, the system may perform a range of calculations based on the tracked values. For instance, the system may compute the difference between a hit counter and a miss counter when determining whether an instruction is likely to miss. Alternatively, the system may perform more complex calculations when determining whether to send a speculative request. For example, the system may calculate the ratio of misses to hits for a given instruction, and then compare this value to a range of thresholds to determine a suitable course of action. In one specific example, if the calculated value for the ratio of misses to hits is below a first threshold (e.g., 0.5), the system does not send a speculative request to an L2 cache. If the value is between the first threshold and a second threshold (e.g., 1.0 for the ratio of misses to hits), the system may only send a speculative request if the network utilization between the L1 and L2 caches is low. However, if the value is above the second threshold, the system sends a speculative request regardless of cache network utilization.

In some embodiments, the system can track hit and miss values for multiple cache levels, and send speculative requests to multiple cache levels based on the hit and miss counters for the different cache levels. For instance, if counters for both an L1 and an L2 cache indicate likely misses, the system may simultaneously send load requests to the L1, L2 and L3 caches. Speculative requests can also be issued to main memory as well if the counters indicate a miss in all cache levels. In some embodiments, the system may speculatively bypass some caches. For example, if the system predicts a very high likelihood of a miss in an L1 cache, the system may bypass the L1 cache and initially only send a speculative request to the L2 cache (e.g., to reduce power consumption in the L1 cache).

Figure 2A:
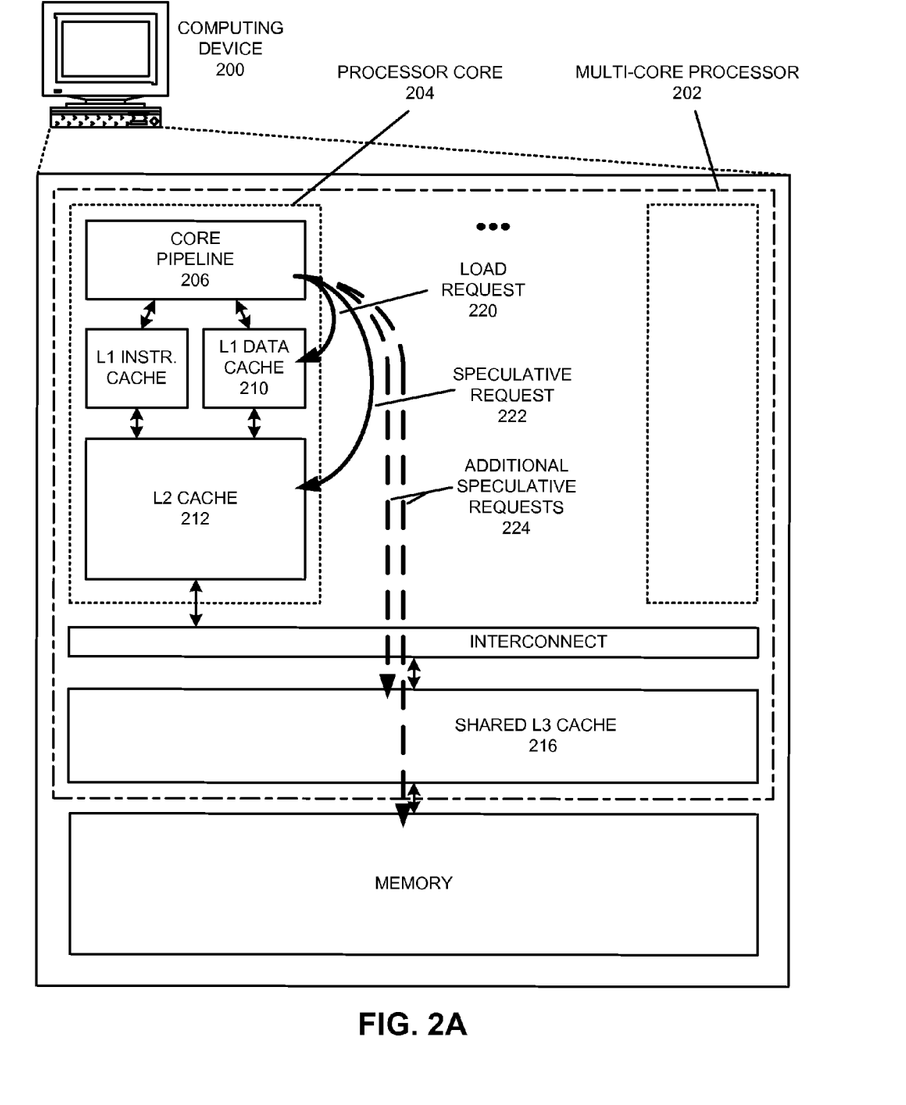
FIG. 2A illustrates an exemplary speculative request operation in a multi-core processor that uses speculative cache requests to reduce cache miss delays in accordance with an embodiment.

FIG. 2A illustrates an exemplary speculative request operation in a computing device 200 with a multi-core processor 202 that uses speculative cache requests to reduce cache miss delays. Processor core 204 includes a set of two hardware counters (not shown) that are used to track instruction hit and miss rates for the memory hierarchy. More specifically, in this example, a hit counter is incremented every time a memory access hits in the L1 cache, and a miss counter is incremented every time a memory access misses in the L1 cache. Note that instructions and their respective counters can be uniquely identified by the instruction's program counter.

During operation, processor core 204 issues a load instruction for an address A in core pipeline 206. Core pipeline 206 checks the counters for this load instruction; if this is the first time the load instruction is executed, core pipeline 206 initializes the counters to a known value. If the difference between the miss counter and the hit counter is smaller than some threshold $t_1$, core pipeline 206 assumes that the load will hit again in L1 data cache 210, and the load proceeds normally by sending a load request 220 to L1 data cache 210 (i.e., no speculative request is sent to L2 cache 212). However, if the difference between the miss counter and the hit counter is greater than some threshold $t_1$, core pipeline 206 assumes that the load will miss again in L1 data cache 210, and simultaneously sends both a load request 220 to L1 data cache 210 and a speculative load request 222 for address A to L2 cache 212. Note that while the above description discloses calculating the difference between the two counters, the system may instead (or additionally) use a ratio or some other function of the tracked values to determine whether to send speculative requests.

The request 222 sent to L2 cache 212 is considered speculative because L1 data cache 210 may actually already contain the data at address A, in which case speculative request 222 is spurious. If speculative request 222 was sent and load request 220 hits in L1 data cache 210, the speculative request 222 can be aborted or the returned data can be discarded. If load request 220 misses and no speculative request 222 was sent, a subsequent (now non-speculative) request will need to be sent to L2 cache 212 for address A. Once the requested data from address A is received, core pipeline 206 can update the hardware counters. If address A was found in L1 data cache 210, core pipeline 206 updates the hit counter for the load instruction; otherwise, the miss counter is updated.

Note that core pipeline 206 may also track hit and miss values for additional levels of the memory hierarchy (e.g., for L2 cache 212 and shared L3 cache 216), and may send additional speculative requests 224 to lower levels of the memory hierarchy if calculations indicate that lower levels of the cache hierarchy may also miss.

Figure 2B:
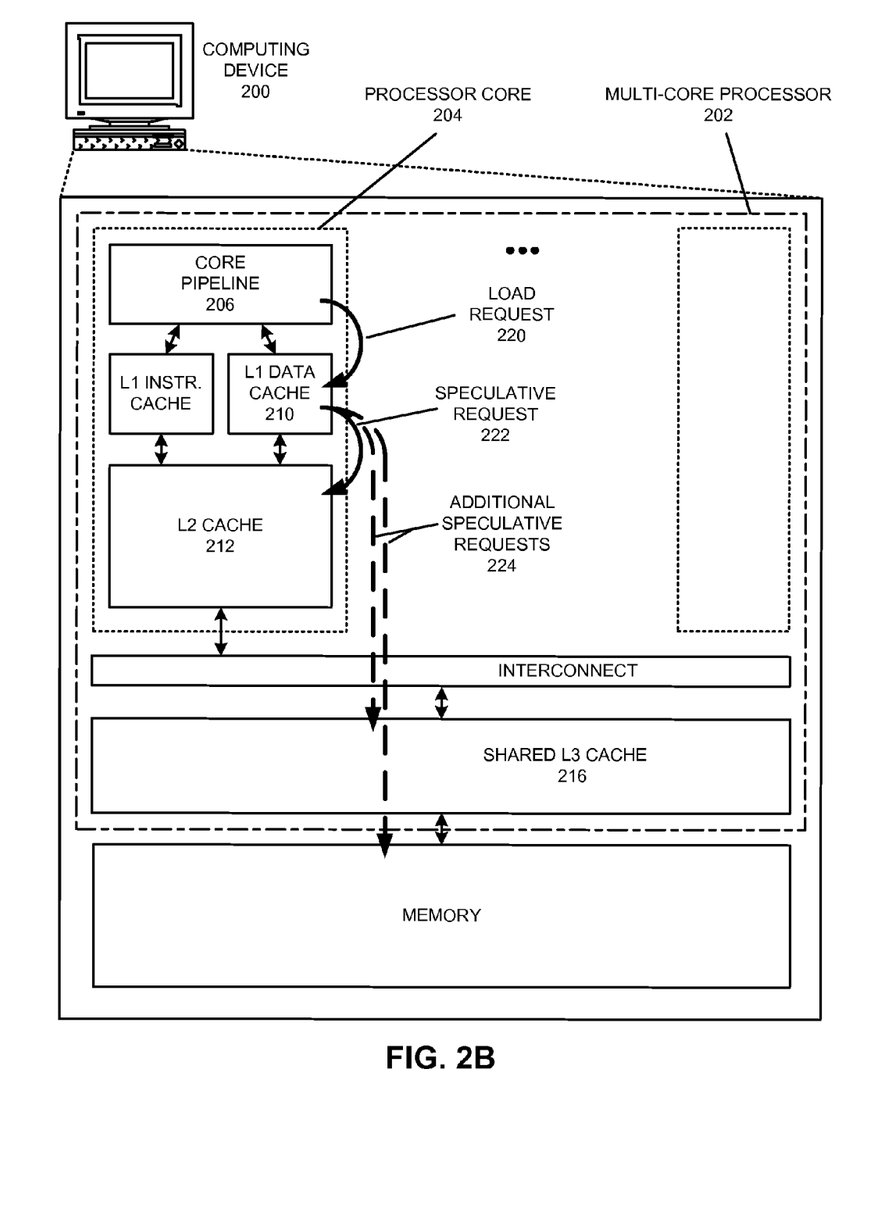
FIG. 2B illustrates an alternative exemplary speculative request operation in a multi-core processor that uses speculative cache requests to reduce cache miss delay in accordance with an embodiment.

Note also that, while FIG. 2A illustrates a scenario where core pipeline 206 maintains the counters and initiates speculative requests 222-224, other hardware structures may implement the tracking functionality and initiate speculative requests. For instance, in some embodiments one or more components of the memory hierarchy may initiate speculative requests (as illustrated in FIG. 2B, where L1 data cache 210 performs the tracking operations and issues speculative requests 222-224 to lower levels of the memory hierarchy). Some such components may not have access to the same set of information available at the processor level (e.g., may not be able to perform tracking on a specific per-instruction basis, unless such information is included in the request sent to the cache), but may still be able to perform tracking based on other information (e.g., by tracking the hit and miss rates for memory addresses being accessed instead of for instructions).

Figure 3:
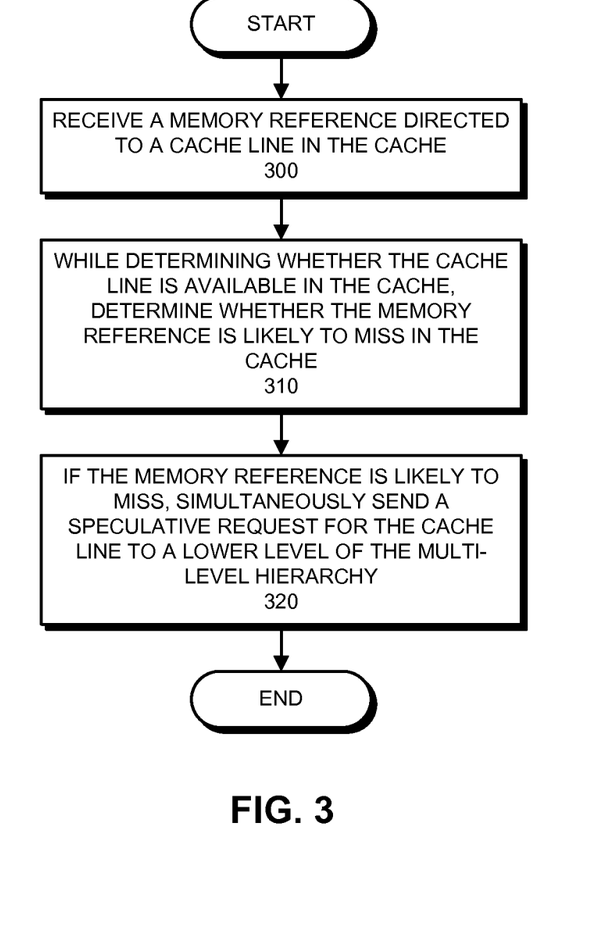
FIG. 3 presents a flow chart illustrating the process of using speculative cache requests to reduce cache miss delays in accordance with an embodiment.

FIG. 3 presents a flow chart that illustrates the process of using speculative cache requests to reduce cache miss delays for a cache in a multi-level memory hierarchy. During operation, the system receives a memory reference which is directed to a cache line in the cache (operation 300). While determining whether the cache line is available in the cache (but prior to completing a full cache lookup), the system determines whether the memory reference is likely to miss in the cache (operation 310), and if so, simultaneously sends a speculative request for the cache line to a lower level of the multi-level memory hierarchy (operation 320). Preemptively sending the speculative request reduces the cache miss delay when the cache line is not available in the cache.

While the preceding examples described a hardware decision circuit that uses counters, other techniques may maintain other data fields (e.g., arrays of hashed cache tag values, etc.) that facilitate quickly determining whether a cache is likely to miss for a given memory reference. Such techniques do not need to be 100% correct in speculatively identifying cascading misses to improve performance; however, to provide performance benefits they will typically need to: (1) be sufficiently accurate to improve performance and justify any additional hardware complexity and overheads (e.g., additional associated power consumption); and (2) reach a speculative decision before the full process of conclusively determining whether the memory process hits or misses in the cache completes.

As mentioned above, the system may use a range of techniques to decide whether to send a speculative request. In some embodiments, the system may use hints and analyses provided by software techniques to determine when to issue speculative requests. For instance, the system may use a compiler to perform program analysis to identify instructions that are likely to cause cache misses. The compiler can mark such instructions during compilation (e.g., using a one bit marker in an instruction field or a special instruction opcode). A processor detecting such an instruction can take this recommendation and perform a speculative request, or can view the recommendation as an additional factor in its own internal decision-making process (e.g., focusing hardware tracking resources on instructions that have been marked by the compiler).

Note that such techniques can also be extended to make use of the hardware tracking data described above. For instance, the system may first execute a program for profiling purposes, and can store the hit and miss data tracked in hardware counters. This profiling data can then be fed back into the compiler, which analyzes the profile data to more accurately identify likely cache misses and outputs an updated program executable that includes marked instructions.

The actual performance improvements associated with speculative requests to lower levels of the memory hierarchy may vary (e.g., depending, in part, on cache and processor architecture and design goals). For instance, power consumption is an increasingly important design factor (as opposed to only execution speed), and attempts to reduce power consumption can dramatically change cache organization. Traditional lookup techniques performed cache tag and array lookups in parallel, but cache array lookups may consume substantial power. Hence, some modern caches perform the tag lookup first, and then only perform an array lookup when a tag match indicates that the data is actually available in the cache (and, for a multi-way cache, pinpoints the specific cache way containing the desired data, thereby sparing the cache from needlessly having to power up the circuits for all of the available cache ways). The benefits of techniques that use speculative requests (if sufficiently accurate) tend to increase as the number of cycles required for cache lookups (and misses) grows.

Note that sending speculative requests may increase power consumption (due to additional lower-level cache operations). However, if the system can successfully identify the small set of memory references that are likely to cause cache misses (and especially cascading cache misses), the performance benefits of such requests may outweigh the power costs. Furthermore, in some embodiments the system can be tuned to only selectively send speculative requests for instructions that are in the critical path of program execution. For instance, the system may only send speculative requests for memory references that the compiler has identified as being in a critical path and being very likely to cause a cascading miss, thereby using additional resources only in situations where there are clear benefits.

Caches located lower in the memory hierarchy tend to be highly interleaved and otherwise designed to support multiple requests from client caches (e.g., multiple higher-level caches), so additional speculative requests should not cause substantial additional contention in lower-level caches. In some embodiments, lower-level caches may signal their load level to higher-level caches, which may then reduce the number of speculative requests when load levels are high. Alternatively, speculative requests may be marked in a manner that clearly distinguishes them from non-speculative requests, allowing lower-level caches to selectively drop lower-priority speculative requests when load is high (e.g., giving known misses higher priority). Note that, unlike pre-fetching techniques, the described techniques occur at the time of the actual memory access, and hence do not pollute any of the caches involved (i.e., the data being accessed will be used immediately).

Note also that the described techniques need to ensure that the cache coherence protocol can deal with speculation, and that cache consistency is maintained. For example, in the case of an inclusive L2 cache (e.g., where data cached in the L1 cache is guaranteed to also be in the L2 cache), simultaneous requests sent to the L1 and L2 caches are a non-issue; if the requested memory address was in the L1 cache, the value returned from the L2 cache does not affect cache coherency, and can be discarded. However, if a speculative technique bypasses the L1 cache and only sends a speculative request to the L2 cache, the system needs to ensure that a value returned from the L2 cache does not violate cache consistency (e.g., if newer data for the memory address is stored in the L1 cache, the value from the L2 cache is actually invalid).

In summary, embodiments of the present invention involve identifying instructions that are likely to miss in multiple cache levels. Upon executing such an instruction, the described system can then simultaneously send an additional speculative request to one or more levels of the memory hierarchy. Sending such preemptive speculative requests for likely misses can reduce cache miss latency, thereby improving program performance.

Computing Environment

Figure 4:
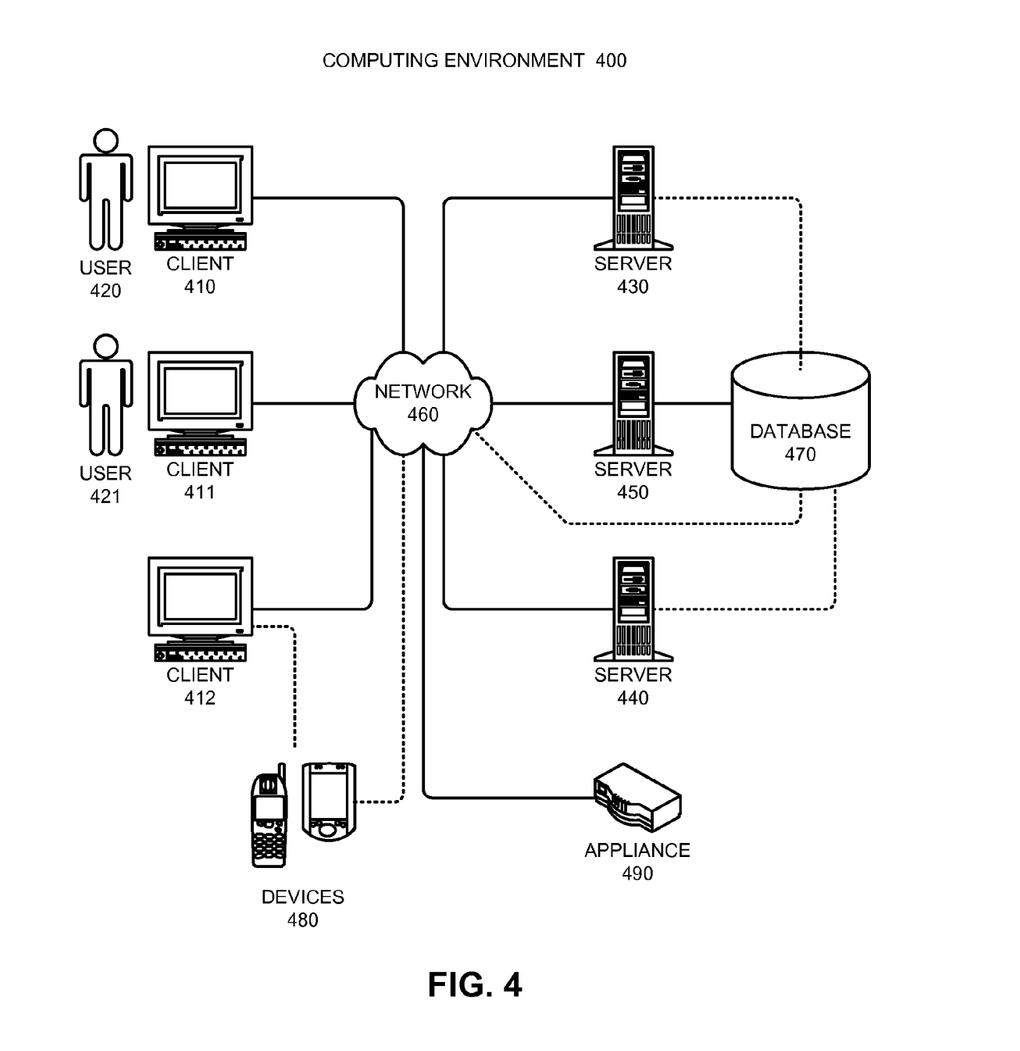
FIG. 4 illustrates a computing environment in accordance with an embodiment.

In some embodiments of the present invention, techniques for reducing cache miss delays can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information related to diagnostic information and/or diagnostic formatters. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that includes one or more caches in a multi-level memory hierarchy may incorporate elements of the present invention.

Figure 5:
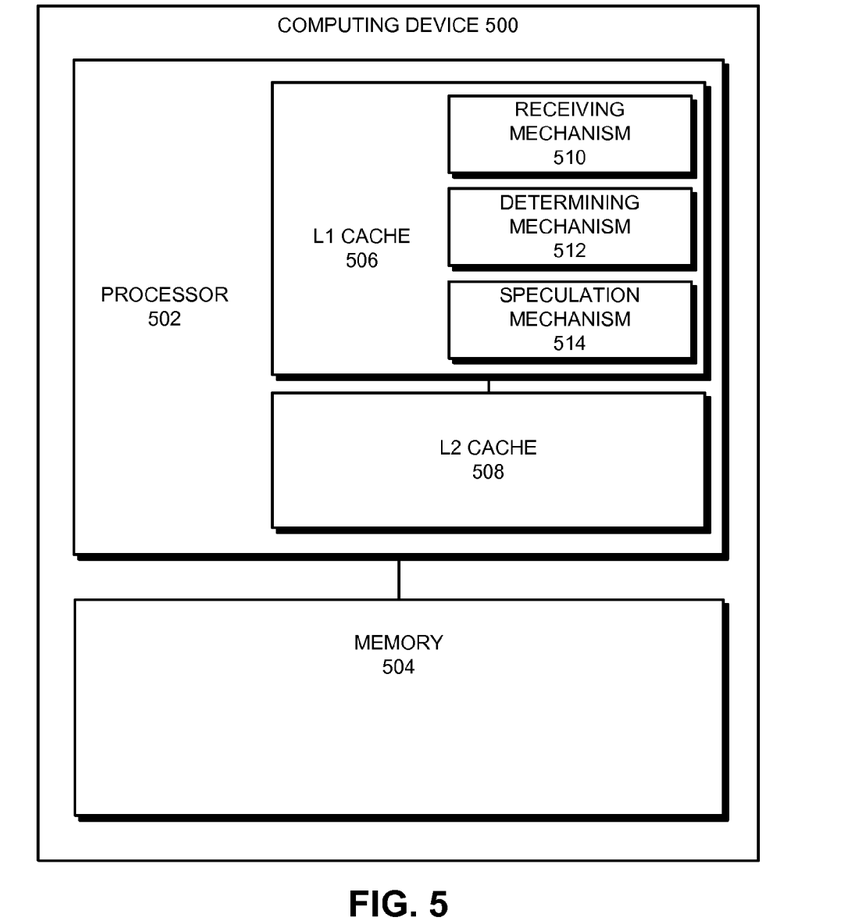
FIG. 5 illustrates a computing device in accordance with an embodiment.

FIG. 5 illustrates a computing device 500 that includes a processor 502 and a memory 504. Processor 502 includes an L1 cache 506 and an L2 cache 508; L1 cache 506, L2 cache 508, and memory 504 form a multi-level memory hierarchy for processor 502. L1 cache 506 includes a receiving mechanism 510, a determining mechanism 512, and a speculation mechanism 514. Note that receiving mechanism 510, determining mechanism 512, and speculation mechanism 514 may also be located externally to L1 cache 506 (e.g., directly in processor 502). Computing device 500 uses receiving mechanism 510, determining mechanism 512, and speculation mechanism 514 to send speculative cache requests that reduce cache miss delays.

During operation, computing device 500 uses receiving mechanism 510 to receive a memory reference which is directed to a cache line in a cache (e.g., in L1 cache 506). While determining whether the cache line is available in the cache, determining mechanism 512 determines whether the memory reference is likely to miss in the cache. If so, speculation mechanism 514 simultaneously sends a speculative request for the cache line to a lower level of the multi-level memory hierarchy (e.g., to L2 cache 508). Note that preemptively sending the speculative request facilitates reducing the cache miss delay when the cache line is not available in the first cache.

In some embodiments of the present invention, some or all aspects of receiving mechanism 510, determining mechanism 512, and/or speculation mechanism 514 can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 510, determining mechanism 512, and/or speculation mechanism 514 may be performed using general-purpose circuits in processor 502 that are configured using processor instructions. Also, while FIG. 5 illustrates receiving mechanism 510, determining mechanism 512, and speculation mechanism 514 as being internal to processor 502, in alternative embodiments some or all of these mechanisms can be external to processor 502.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using speculative cache requests to reduce cache miss delays, the method comprising:
   receiving a memory reference which is directed to a cache line in a cache, wherein the cache is part of a multi-level memory hierarchy; and
   while determining whether the cache line is available in the cache, determining whether the memory reference is likely to miss in the cache, and if so, simultaneously sending a speculative request for the cache line to a lower level of the multi-level memory hierarchy,
   wherein determining whether the memory reference is likely to miss in the cache comprises using a program counter for an instruction for the memory reference to identify a counter in a set of counters that corresponds to the memory reference, wherein the counter counts at least one of hits and misses for the instruction for the memory reference separately from hits and misses for other instructions.

2. The method of claim 1, wherein the method further comprises sending the speculative request for the cache line to multiple levels of the multi-level memory hierarchy in parallel.

3. The method of claim 1,
   wherein determining whether the memory reference is likely to miss in the cache involves determining that the memory reference is likely to miss prior to completing a full lookup operation in the cache; and
   wherein preemptively sending the speculative request facilitates reducing the cache miss delay when the cache line is not available in the cache.

4. The method of claim 3, wherein determining whether the memory reference is likely to miss in the cache involves one or more of the following:
   receiving an indication associated with the instruction for the memory reference that the cache line is likely to miss in the cache; and
   determining that the cache line is likely to miss in the cache using tracking data stored during execution of a program.

5. The method of claim 4, wherein the method further involves:
   performing profiling operations while executing the program on a processor to generate profiling information;
   analyzing the profiling information to identify a program instruction in the program that is likely to involve a cache miss; and
   modifying the program instruction to indicate that the program instruction is likely to involve a cache miss.

6. The method of claim 5,
   wherein modifying the program instruction involves marking a field in the program instruction to indicate a likely cache miss;
   wherein a marked field indicates that a speculative request should be sent for the program instruction.

7. The method of claim 4,
   wherein the tracking data is generated using the counter for the memory reference; and
   wherein the method further involves using values tracked in the counter to determine whether the memory reference is likely to miss in the cache.

8. The method of claim 7, further comprising:
   using the counter to track a number of times that a program instruction has executed;
   calculating a difference between the counter and a miss counter or a hit counter to determine hit and miss rates for the program instruction.

9. The method of claim 7, further comprising one or more of the following:
   tracking previous hits and misses for the memory reference using a hit counter and a miss counter; and
   tracking previous hits and misses for the memory reference using a saturating counter.

10. The method of claim 7, wherein the method further involves comparing a calculated value derived using tracked hit and miss values with a threshold to determine whether to send the speculative request.

11. The method of claim 10, wherein calculating the calculated value involves weighing previous misses differently from previous hits.

12. A computer system that uses speculative cache requests to reduce cache miss delays, comprising:
   a processor;
   an L1 cache; and
   an L2 cache;
   wherein while determining whether the cache line is available in the L1 cache, the processor is configured to determine whether a memory reference is likely to miss in the L1 cache, and if so, to simultaneously send a speculative request for the cache line to the L2 cache,
   wherein determining whether the memory reference is likely to miss in the L1 cache comprises using a program counter for an instruction for the memory reference to identify a counter in a set of counters that corresponds to the memory reference, wherein the counter counts at least one of hits and misses for the instruction for the memory reference separately from hits and misses for other instructions.

13. The computer system of claim 12, wherein determining whether the memory reference is likely to miss in the L1 cache involves determining that the memory reference is likely to miss prior to completing a full lookup operation in the L1 cache; and
   wherein preemptively sending the speculative request facilitates reducing the cache miss delay when the cache line is not available in the L1 cache.

14. The computer system of claim 13, wherein determining whether the memory reference is likely to miss in the L1 cache involves receiving an indication associated with the instruction for the memory reference that the cache line is likely to miss in the L1 cache.

15. The computer system of claim 14, wherein the computer system further comprises a profiling mechanism configured to:
   perform profiling operations while executing a program on the processor to generate profiling information;
   analyze the profiling information to identify a program instruction in the program that is likely to involve a cache miss in the L1 cache; and
   modify the program instruction to indicate that the program instruction is likely to involve a cache miss.

16. The computer system of claim 14,
wherein the processor further comprises a tracking mechanism configured to track previous hits and misses for the memory reference; and
wherein the processor is configured to use values tracked by the tracking mechanism to determine whether the memory reference is likely to miss in the L1 cache.

17. The computer system of claim 16, wherein the tracking mechanism is further configured to:
track previous hits and misses for the memory reference using a hit counter and a miss counter; or
track previous hits and misses for the memory reference using a saturating counter.

18. The computer system of claim 17, wherein the processor is configured to compare a calculated value derived using tracked hit and miss values with a threshold to determine whether to send the speculative request.

19. The computer system of claim 18, wherein calculating the calculated value involves weighing previous misses differently from previous hits.

20. A cache that uses speculative cache requests to reduce cache miss delays, wherein the cache is part of a multi-level memory hierarchy, comprising:

a receiving mechanism configured to receive a memory reference which is directed to a cache line in the cache;

a determining mechanism configured to determine whether the memory reference is likely to miss in the cache prior to completing a full lookup operation in the cache, wherein while determining whether the memory reference is likely to miss in the cache, the determining mechanism is further configured to use a program counter for an instruction for the memory reference to identify a counter in a set of counters that corresponds to the memory reference, wherein the counter counts at least one of hits and misses for the instruction for the memory reference separately from hits and misses for other instructions; and a speculation mechanism configured to simultaneously send a speculative request for the cache line to a lower level of the multi-level memory hierarchy when the determining mechanism determines that the memory reference is likely to miss in the cache.

\* \* \* \* \*

UNITED STATES PATENT AND TRADEMARK OFFICE
CERTIFICATE OF CORRECTION

PATENT NO.         : 8,683,129 B2
APPLICATION NO.    : 12/909429
DATED              : March 25, 2014
INVENTOR(S)        : Ono et al.

It is certified that error appears in the above-identified patent and that said Letters Patent is hereby corrected as shown below:

On title page, References Cited, column 2, under Other Publications, line 5, delete "SICARCH" and insert -- SIGARCH --, therefor.

Signed and Sealed this
Twenty-sixth Day of August, 2014

Michelle K. Lee
*Deputy Director of the United States Patent and Trademark Office*